United States Patent [19]

Gowda et al.

[11] Patent Number: 5,509,053
[45] Date of Patent: Apr. 16, 1996

[54] METHOD AND APPARATUS FOR ROUTING A CALL TO A MOBILE COMMUNICATION UNIT IN A TELEPOINT COMMUNICATION SYSTEM

[75] Inventors: Prashanth M. L. Gowda; Nu S. Woon; Baheerathan Rajalingam; Abraham P. Thomas; Foo C. Seng; Han W. Khang; Woon H. Swee, all of Singapore, Singapore; Gary T. Chu, Fort Worth, Tex.

[73] Assignee: Motorola, Inc., Schaumburg, Ill.

[21] Appl. No.: 305,538

[22] Filed: Sep. 14, 1994

[51] Int. Cl.$^6$ .................................................. H04Q 7/20
[52] U.S. Cl. .................................................. 379/63; 379/58
[58] Field of Search ............................... 379/58, 59, 61, 379/63, 57, 56; 455/33.1

[56] References Cited

U.S. PATENT DOCUMENTS

| | | | |
|---|---|---|---|
| 4,833,701 | 5/1989 | Comroe et al. | 379/60 |
| 5,036,531 | 7/1991 | Spear | 379/58 |
| 5,090,051 | 2/1992 | Muppidi et al. | 379/61 |
| 5,212,684 | 5/1993 | MacNamee et al. | 379/61 X |
| 5,315,637 | 5/1994 | Breeden et al. | 379/58 |

*Primary Examiner*—Curtis Kuntz
*Assistant Examiner*—Michael B. Chernoff
*Attorney, Agent, or Firm*—Darleen J. Stockley

[57] ABSTRACT

A telepoint communication system 100 where the affiliation of communication unit 125 and 130 with telepoint base station 120 and 122 is maintained at a mobility management unit (MMU) 117. When an inbound call for the mobile communication unit 125 and 130 is received on the PSTN 110, the location of the mobile communication unit 125 and 130 is determined from the MMU 117 and a communication channel at the telepoint base station is reserved, and routing information to the reserved communication channel is provided to the PSTN, enabling the mobile communication unit 125 and 130 to receive the inbound call.

15 Claims, 3 Drawing Sheets

METHOD AND APPARATUS FOR ROUTING A CALL TO A MOBILE COMMUNICATION UNIT IN A TELEPOINT COMMUNICATION SYSTEM

FIELD OF THE INVENTION

This invention relates in general to telepoint communication systems, and in particular to a method and apparatus for routing an inbound call in a telepoint communication system.

BACKGROUND OF THE INVENTION

CT2 communication systems that utilise available public switched telephone network (PSTN) infrastructure to provide micro cellular wireless communication services are known in the art. A typical CT2 communication system comprises a plurality of portable communication units and a variety of equipment that are coupled to the PSTN. This equipment includes a switching unit and a plurality of telepoint base stations (TBS). Typically CT2 subscribers could initiate calls but could not receive calls, however, recent developments of integrating a paging receiver into the portable communication units, and the use of the switching unit allow calls to be made to, and received by, CT2 subscribers.

With these recent developments, when the PSTN receives an incoming call for a CT2 subscriber unit, the call is routed to the switching unit while the caller is put on hold. The switching unit translates the called number into a pager number and pages the CT2 subscriber, providing the subscriber unit with a selected call back number of the switching unit. Upon receiving the page, the subscriber unit alerts the subscriber who initiates a call to the call back number of the switching unit. Upon receiving the call from the subscriber unit, the switching unit couples the incoming call with the call from the subscriber unit, and direct communication between the caller and the CT2 subscriber unit may then proceed.

Another method of providing CT2 subscribers with the additional capability to receive calls, requires the portable communication units to register with at least one TBS, and the registration information maintained in a central database. With the use a switching unit coupled to the PSTN, when an inbound call for a CT2 subscriber is received, the PSTN forwards the call to the switching unit. Subsequently, an outbound call is made by the switching unit to the CT2 subscriber using the registration information in the central database. When the call to the CT2 subscriber unit is established, the switching unit couples the inbound and outbound calls, thereby allowing direct communication between the calling party and the CT2 subscriber via the switching unit.

The methods described above provide a significant improvement to early CT2 communication systems by allowing CT2 subscriber units to receive calls. However, a significant disadvantage of the paging method is the uncomfortably long period of time a caller is kept on hold while a call to a subscriber unit is established. Yet another disadvantage of the paging method is the need for CT2 subscriber units to be equipped with integrated paging receivers thereby increasing the cost and complexity of the subscriber units. Also, as paging throughput is dependent on user traffic, the paging process can introduce an additional unpredictable delay, further prolonging the time a calling party is kept on hold.

A disadvantage of both methods is the use of an expensive switching unit. The switching unit is coupled to the PSTN using trunk telephone lines, and consequently, is expensive to install, use and maintain. In addition, as the switching unit provides the coupling for each call to a CT2 subscriber, the number of switches i.e. the size of the switching unit, determines the throughput. Hence, to ensure an acceptable grade of service a large switching unit is required.

Therefore, a need exists for a quick and economical method for processing an incoming call in a telepoint communication system that will not require a switching unit to be coupled to the PSTN, preferably does not use paging, and establishes a call from caller to subscriber within a substantially shorter, predictable period of time.

SUMMARY OF THE INVENTION

In carrying out the objects of the present invention in one form, there is provided a method for processing a call in a telepoint communication system where a mobile management unit tracks the location of a CT2 subscriber by maintaining a database of the affiliation of the CT2 subscriber with telepoint base stations, and channels an inbound call for the CT2 subscriber to the telepoint base station to which the CT2 subscriber is affiliated.

DETAILED DESCRIPTION OF THE INVENTION

Figure 1:
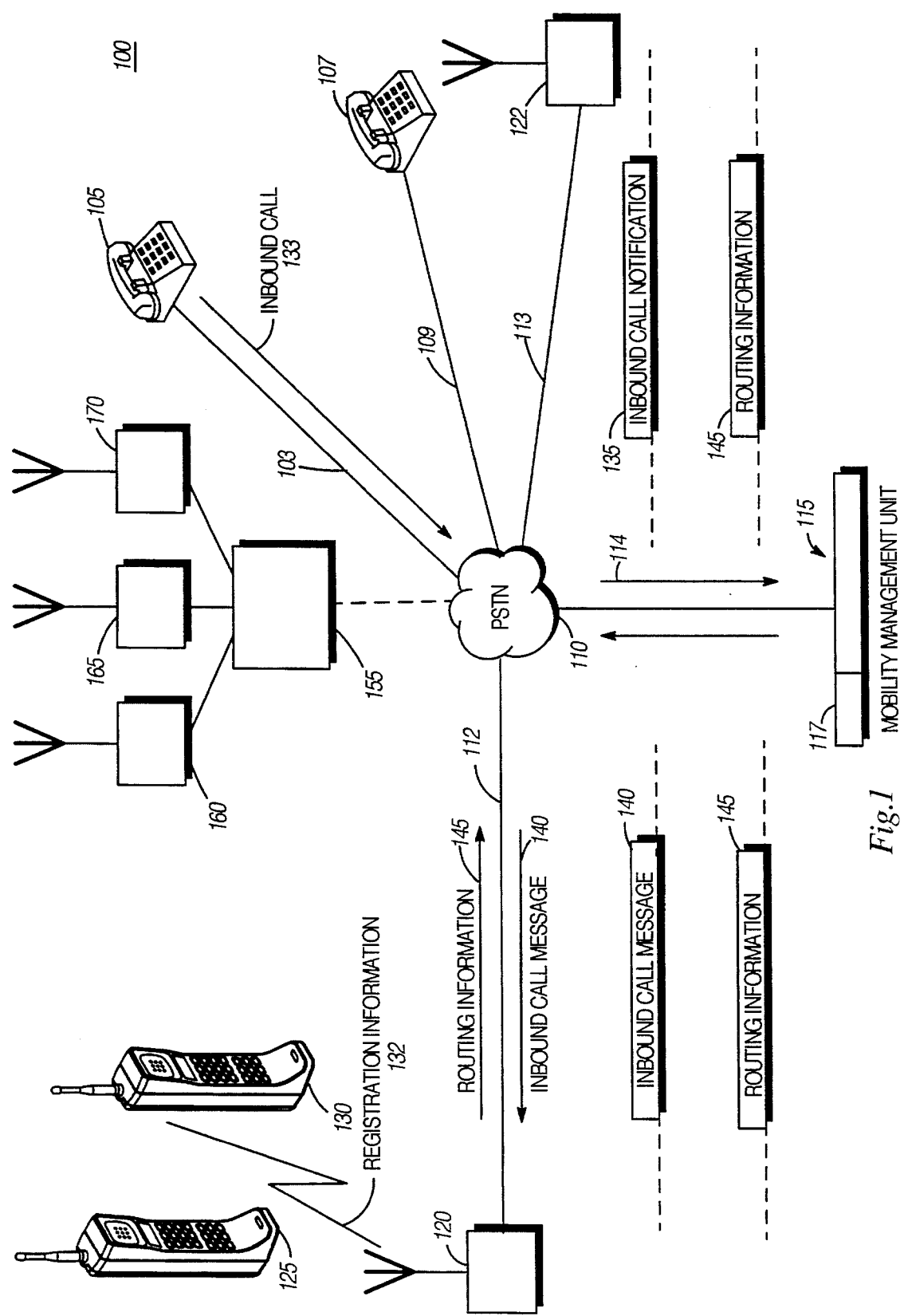
FIG. 1 illustrates a telepoint communication system in accordance with a preferred embodiment the present invention.

FIG. 1 illustrates a telepoint communication system 100 comprising a public switched telephone network (PSTN) 110 that preferably supports integrated services digital network (ISDN) in accordance with a preferred embodiment of the present invention. Telephone subscribers 105 and 107 are coupled to the PSTN 110 via communication channels 103 and 109 respectively, while telepoint base stations (TBS) 120 and 122 are coupled to the PSTN 110 via communication channels 112 and 113 respectively. The communication channels 103, 109, 112 and 113 may, for example, be one or more ISDN basic rate interfaces (BRI), where each BRI can simultaneously support two communication links. A mobility management unit (MMU) 115 is coupled to the PSTN 110 via communication channel 114 which may comprise, for example, a Consultative Committee on International Telephone and Telephone signal system number seven data link, commonly referred to as an SS7 link, and at least one BRI link. The MMU 115 may comprise a computer which includes database 117. The database 117 may comprise semiconductor memory or magnetic or optic storage media. Mobile communication units 125 and 130 communicate over radio communication channels with TBS 120 and 122 which effectively couples the mobile communication units 125 and 130 to the PSTN 110 via communication channels 112 and 113.

Alternatively, with reference to FIG. 1, telepoint base stations 160, 165 and 170 may be coupled to a concentrator 155 that is coupled to the PSTN 110. The telepoint base stations 160, 165 and 170 are coupled to the concentrator 155 via communication channels 152, 153 and 154 respectively, that may, for example, comprise a proprietary type of communication link. The concentrator 155 is coupled to the PSTN 110 via communication channel 150 that may comprise, for example, one or more ISDN primary rate interfaces (PRI) where each PRI can simultaneously support 30 communication links. The MMU 115 may communicate with the concentrator 155 via the PSTN 110 and communication channel 150, or by separate data links, for example, a X.25 data link that couples the concentrator 155 and the MMU 115 directly.

Information communicated from the mobile communication unit 125 and 130 to the TBS 120 or 122 comprises registration information 132, while information communicated between the telephone subscribers 105 or 107 and the PSTN 110 include an inbound call 133 which may comprise, for example, a telephone number affiliated with the mobile communication unit 125 or 130. In response to the inbound call 133, the PSTN 110 may transmit an inbound call notification 135 to the MMU 115. Subsequently, the MMU 115 may communicate an inbound call message 140 to the TBS 120 or 122 via the PSTN 110. Upon receiving the inbound call message 140, the TBS 120 or 122 may respond by transmitting routing information 145 to the MMU 115 via the PSTN 110. The MMU 115, upon receiving the routing information 145, may transmit the routing information 145 to the PSTN 110 for further action by the PSTN 110.

Figures 2, 3:
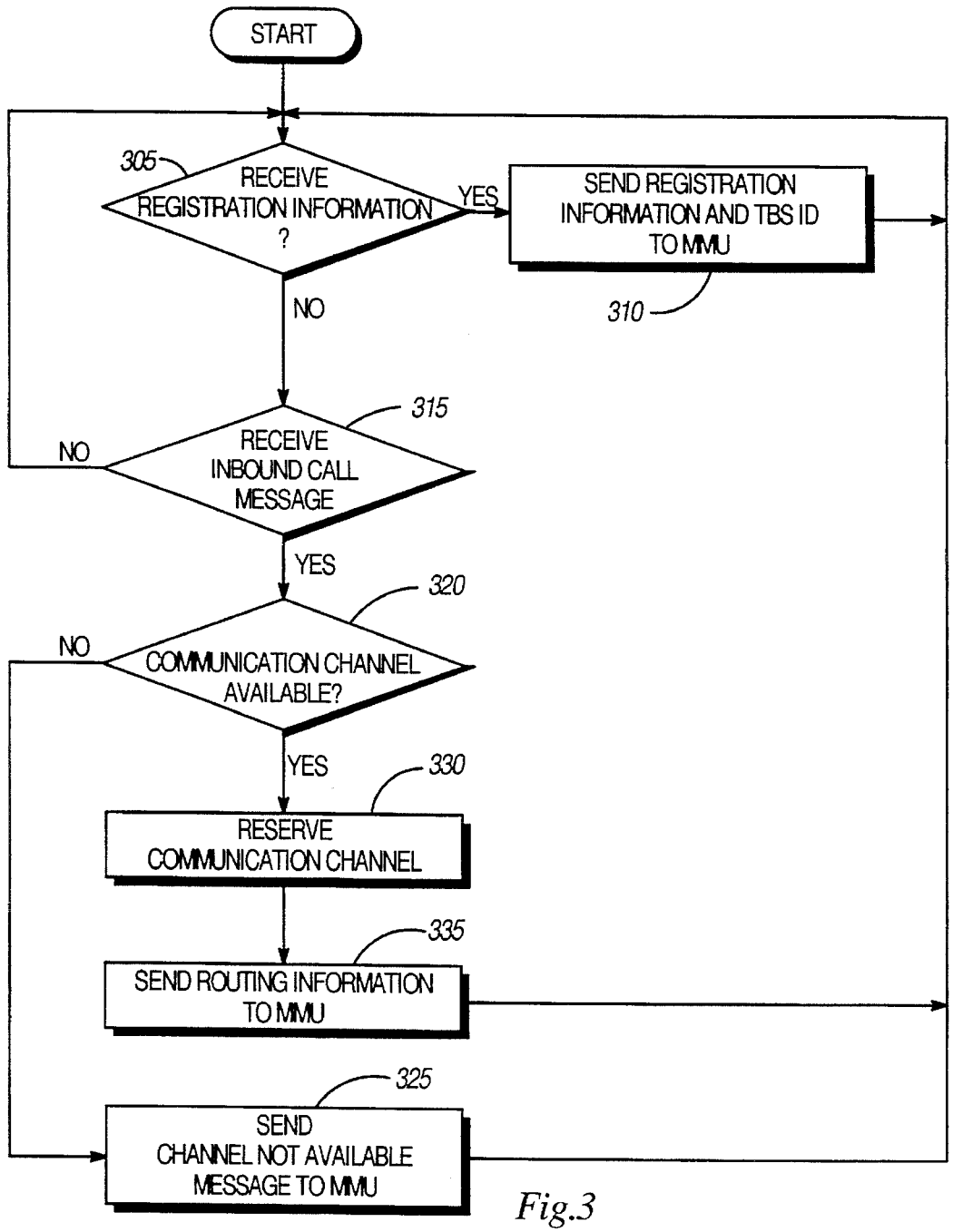
FIG. 2 illustrates a table representing information stored in the mobility management unit of the telepoint communication system in FIG. 1 in accordance with the preferred embodiment of the present invention.
FIG. 3 illustrates a flowchart detailing operation of a telepoint base station in the telepoint communication system in FIG. 1 in accordance with the preferred embodiment of the present invention.

For the mobile communication unit 125 or 130 to receive the inbound call 133, the location of the mobile communication unit 125 or 130 is tracked and stored in the database 117. With reference to FIG. 2, the information in the data base 117 may be organised as illustrated in table 118. When the mobile communication unit 125 or 130 having a personal ID 210 is introduced to the telepoint communication system 100, the initialisation of the mobile communication unit 125 or 130 into the telepoint communication system 100 includes assigning a subscriber ID 205 to the mobile communication unit 125 or 130, and programming the personal ID 210 and the subscriber ID 205 into the database 117. The subscriber ID 205 may be a telephone number that becomes affiliated with the mobile communication unit 125 or 130 by the assignment, and hence, it is the number used by a calling party to call the mobile communication unit 125 or 130. The personal ID 210 is usually programmed into a mobile communication unit 125 or 130 during manufacture. A TBS ID 215 is affiliated with a TBS 120 or 122 and is assigned when the telepoint system 100 is configured. The TBS ID 125 represents the ID of the TBS 120 or 122 that last received registration information 132 from a mobile communication unit 125 or 130, and transmitted the registration information 132 to the MMU 115. Hence, the information in the TBS ID 215 column is dynamic and will change as the mobile communication unit 125 and 130 roams among the TBSs 120 and 122 in the telepoint communication system 100. The TBS ID 215, for example, may be a telephone number affiliated with a TBS 120 or 122, that may be used by the MMU 115 to communicate with the TBS 120 or 122. Taking the first row of table 118 as an example, the information in the first row indicates that a mobile communication unit 125 or 130 is programmed with personal ID 013015 and assigned subscriber ID 456-1234, and in addition, a transmission of registration information from the mobile communication unit 125 or 130 was last received from a TBS 120 or 122 affiliated with TBS ID 317-4205.

Thus, transmissions of the registration information 132 by the mobile communication unit 125 or 130 enables the MMU 115 to advantageously track the location of the mobile communication unit 125 or 130 in the telepoint communication system 100, allowing the MMU 115 to provide routing information that routes an inbound call for the mobile communication unit 125 or 130 to the location of the mobile communication unit 125 or 130 quickly and predictably, unlike prior art systems that employ paging to locate the mobile communication unit 125 or 130 only after an inbound call for the mobile communication unit 125 or 130 is received by the MMU 115.

FIG. 3 illustrates a flowchart detailing a method for routing an inbound call to the mobile communication unit 125 and 130. When the mobile communication unit 125 or 130 transmits registration information 132 while located within communicable range of the TBS 120 or 122, the TBS 120 or 122 receives 305 the registration information 132 and sends 310 the registration information 132 and a TBS ID 215 affiliated with the TBS 120 or 122, to the MMU 115, which stores the registration information and the TBS ID 215 in memory 117. The mobile communication unit 125 or 130 may, for example, transmit registration information 132 when the mobile communication unit 125 or 130 loses a communication link or when the mobile communication unit 125 or 130 is powered on. Additionally, the registration information 132 may, for example, include the personal ID 210 of the mobile communication unit 125 or 130.

When the inbound call 133 for the mobile communication unit 125 or 130 is received on the PSTN 110, the TBS 120 or 122 subsequently receives 315 an inbound call message. When the TBS 120 or 122 determines 320 that no communication channels are available at the TBS 120 and 122 to route the inbound call 133, the TBS 120 or 122 sends 325 a channel not available message to the MMU 115, which is communicated via the PSTN 110 to the calling party. When the TBS 120 or 122 determines 320 that a communication channel is available, the TBS 120 or 122 reserves 330 the communication channel and sends 335 routing information 145 to the communication channel to the MMU 115, which provides the routing information to the PSTN 110, enabling the PSTN 110 to route the inbound call 133 via the reserved communication channel, to TBS 120 or 122 and to the mobile communication unit 125 and 130 thus, allowing the mobile communication unit 125 and 130 to receive the inbound call 133.

Figure 4:
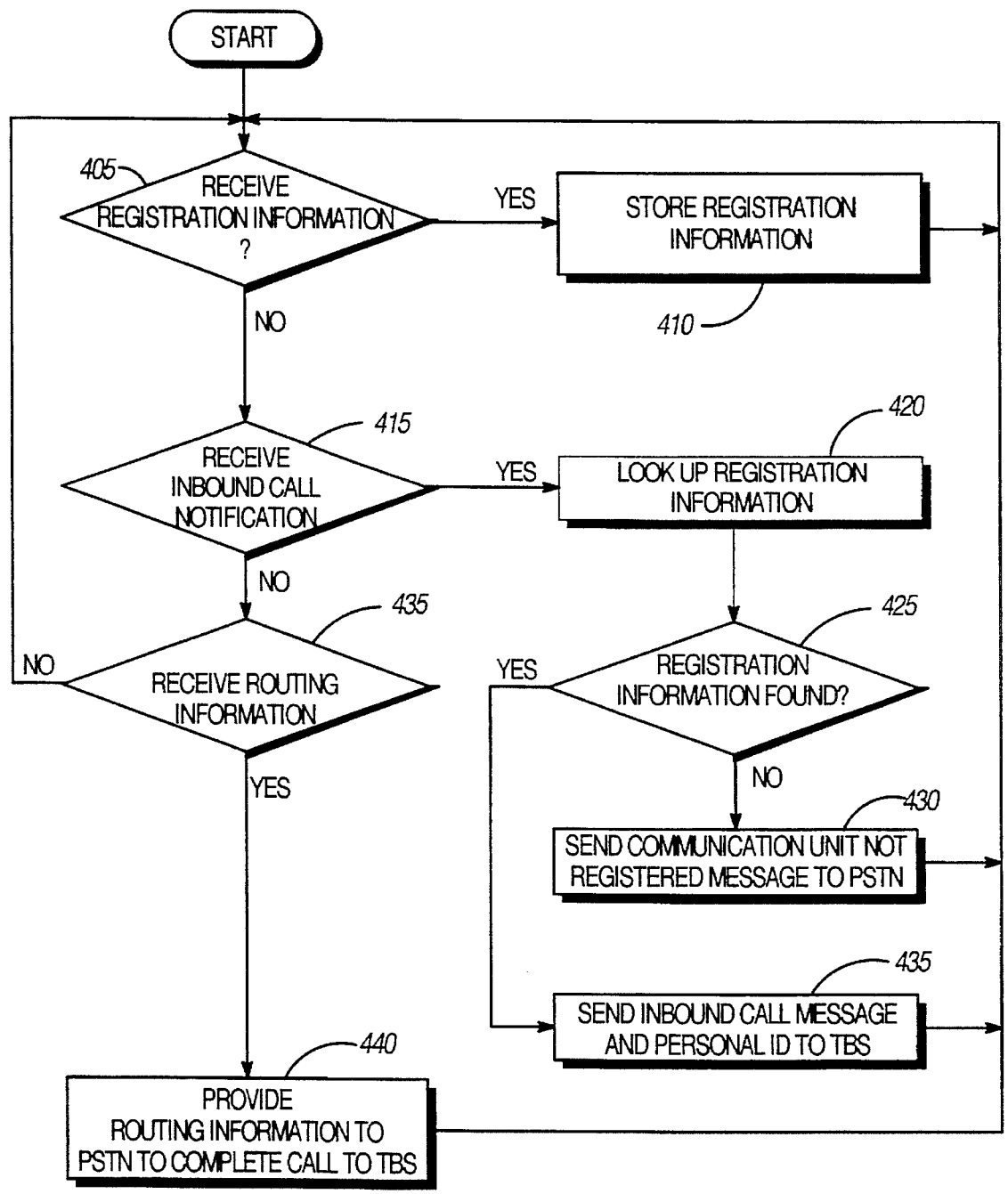
FIG. 4 illustrates a flowchart detailing operation of the mobility management unit in the telepoint communication system in FIG. 1 in accordance with the preferred embodiment of the present invention.

With reference to FIG. 4, when the TBS 120 or 122 sends the registration information 132 of the mobile communication unit 125 or 130 to the MMU 115 as described above, the MMU 155 receives 405 the registration information 132 and the TBS ID 215, and stores the registration information 132 and the TBS ID 215 in the memory 117.

When the PSTN 110 receives the inbound call 133 for the mobile communication unit 125 and 130, the PSTN 110 may determine the call is for a CT2 subscriber from the subscriber ID provided by the calling party, and subsequently provide an inbound call notification 135, that comprises the subscriber ID 205, to the MMU 115. When the MMU 115 receives 415 the inbound call notification 135, the MMU 115 uses the subscriber ID 205 to look up 420 the registration information 132 of the mobile communication unit 125 or 130 in the database 117. When the MMU 115 does not successfully locate the registration information 132 of the mobile communication unit 125 or 130 in the database 117, the MMU 115 sends a communication unit not registered message to the PSTN 110, which forwards the communication unit not registered message to the mobile communication unit 125 or 130. However, when the MMU 115 successfully locates the registration information 132 in the database 117, which comprises the personal ID 210 of the mobile communication unit 125 or 130 and the TBS ID 215 of the TBS 120 or 122 to which the mobile communication unit 125 or 130 last registered, the MMU 115 utilises the TBS ID 215 to send 435 the inbound call message 140 and the personal ID 210 to the TBS 120 and 122.

In response to receiving the inbound call message 140 from the MMU 115, the TBS 120 and 122 as described above, reserves a communication channel and provides routing information 145 to the reserved communication channel to the MMU 115. When the MMU 115 receives 435 the routing information 145, the MMU 115 provides 440 the routing information 145 to the PSTN 110, which subsequently routes the inbound call 133 to the reserved communication channel, thence to the mobile communication unit 125 or 130 via the TBS 120 or 122, allowing the mobile communication unit 125 or 130 to receive the inbound call.

When the concentrator 155 is employed in the telepoint communication system 100, the concentrator 155 may, for example, provide the routing information 145 directly to the PSTN 110 upon receipt of the inbound call message 140.

In accordance with the present invention, conventional features of the PSTN may be utilised to communicate information on the PSTN between a TBS and a MMU enabling the location of a mobile communication unit to be determined, and subsequently enabling an inbound call for the mobile communication unit to be routed to the mobile communication unit. This is achieved by utilising the distributed processing capability inherent in the telepoint base station instead of using an additional switching unit coupled to the PSTN. With distributed processing, existing telepoint base stations are enhanced to provide 2 way calling capability to CT2 subscribers. In addition, with this invention no changes are required to mobile subscriber units to provide the added capability of receiving calls to existing CT2 subscribers, hence, totally avoiding the expensive and troublesome task of recalling the existing mobile communication units from the field for modifications at a service centre.

Hence, this invention provides a quick and economical method for processing an incoming call in a telepoint communication system without the use of additional equipment coupled to the PSTN, and without modifications to the mobile communication units. In addition, as this invention does not rely on paging to locate the subscriber, an inbound call for a subscriber may be established within a substantially shorter, predictable period of time.

What is claimed is:

1. An apparatus coupled to a public switched telephone network (PSTN) to facilitate routing of an inbound call on the PSTN to a mobile communication unit in a telepoint communication system, wherein the apparatus communicates with the PSTN to route the inbound call within the PSTN, the apparatus comprising:

at least one telepoint base station (TBS) coupled to the PSTN for receiving registration information from the mobile communication unit, and for transmitting the registration information received from the mobile communication unit; and a controller coupled to the PSTN and the at least one TBS for receiving the registration information from the at least one TBS and storing the registration information therein, and wherein when the controller receives call information from the PSTN in response to the PSTN receiving an inbound call for the mobile communication unit, the controller utilizes the registration information and the call information to communicate the receipt of the inbound call to the at least one TBS, whereby, in response to the communication from the controller, the at least one TBS reserves a communication channel to receive the inbound call and communicates routing information regarding the reserved communication channel to the PSTN to the controller, in response to communication of the receipt of the inbound call therefrom, and wherein the controller further provides the routing information received from the at least one TBS to the PSTN, the PSTN routes the inbound call over the reserved communication channel and thence via the at least one TBS to the mobile communication unit.

2. The apparatus of claim 1, wherein the PSTN comprises a PSTN supporting integrated system digital network (ISDN).

3. The apparatus of claim 1, wherein the controller comprises a mobility management system.

4. The apparatus of claim 1, wherein the at least one TBS is coupled to the PSTN with at least one basic rate interface (BRI).

5. The apparatus of claim 1, wherein the controller is coupled to the PSTN with a communication channel, wherein the communication channel comprises at least one Consultative Committee on International Telephone and Telephone signal system number 7 data link and at least one BRI.

6. The apparatus of claim 1, wherein the controller and the at least one TBS is coupled via at least one X.25 data link.

7. The apparatus of claim 1, further comprising a concentrator, wherein the at least one TBS, the controller, and the PSTN are coupled to the concentrator, and wherein the concentrator receives the registration information from the at least one TBS and communicates the registration information to the controller, and wherein the concentrator communicates the receipt of the inbound call from the controller to the at least one TBS, and wherein the concentrator receives the routing information from the at least one TBS and communicates the routing information to the controller, and wherein the concentrator receives the inbound call from the PSTN and routes the inbound call to the at least one TBS and thence to the mobile communication unit.

8. A method for routing an inbound call to a mobile communication unit, wherein the inbound call is received on a public switched telephone network (PSTN), and wherein the PSTN is coupled to at least one location via a communication channel of the PSTN, and wherein the communication channel has an identification number associated therewith, and wherein the mobile communication unit is within communicable range of the at least one location, wherein the method comprises the steps of:

a) transmitting a reservation request to the at least one location to reserve the communication channel;

b) in response to the request in step (a), receiving the identification number of the reserved communication channel from the at least one location; and c) transmitting the identification number of the reserved communication channel to the PSTN, thereby enabling the PSTN to route the inbound call to the reserved communication channel using the identification number thereof, and thence to the at least one location, allowing the mobile communication unit to receive the inbound call via the at least one location.

9. The method of claim 8 comprises, prior to step (a), the steps of:

receiving the inbound call on the PSTN; and identifying the mobile communication unit is within communicable range of the at least one location.

10. The method of claim 8 wherein the reservation request comprises a personal identifier (ID) affiliated with the mobile communication unit, wherein step (a) comprises the step of transmitting the personal ID affiliated with the mobile communication unit, to the at least one location.

11. The method of claim 8 wherein the at least one location in step (a) comprises at least one base station, wherein the mobile communication unit is within communicable range of the at least one base station, and wherein the mobile communication unit is registered with the at least one base station.

12. A method for routing a call from a public switched telephone network (PSTN) to a mobile communication unit in a telepoint communication system, wherein the telepoint communication system comprises at least one telepoint base station (TBS) operably coupled to the PSTN via at least one communication channel having an identification number affiliated with the at least one TBS, wherein the method comprises the steps of:

a) receiving registration information from a mobile communication unit by the at least one TBS;

b) in response to receiving the registration information by the at least one TBS, transmitting the registration information to a controller, wherein the controller is coupled to the PSTN;

c) in response to receiving the registration information by the controller, storing the registration information therein;

d) receiving an inbound call notification at the controller from the PSTN in response to the PSTN receiving an inbound call for the mobile communication unit;

e) utilizing the registration information and the inbound call notification to transmit an inbound call message to the at least one TBS from the controller;

f) in response to receiving the inbound call message by the at least one TBS, reserving the at least one communication channel of the PSTN to receive the inbound call; and g) transmitting the identification number of the reserved at least one communication channel from the PSTN to the controller, wherein the controller further transmits the the identification number of the reserved at least one communication channel of the PSTN to the PSTN in response to receiving the identification number of the reserved at least one communication channel of the PSTN from the at least one TBS, wherein the identification number of the at least one communication channel Of the PSTN enables the PSTN to route the inbound call to the reserved at least one communication channel of the PSTN and thence via the at least one TBS to the mobile communication unit.

13. The method of claim 12 wherein reserving the at least one communication channel to the PSTN in step (f) comprises the steps of:

determining the at least one communication channel of the PSTN is available; and providing the identification number of the at least one communication channel of the PSTN to the controller.

14. The method of claim 13 wherein reserving the at least one communication channel of the PSTN in step (f) further comprises the step of keeping the communication channel available for a predetermined period of time.

15. A method of routing a call from a public switched telephone network (PSTN) to a base station of a wireless communication network, the method comprising the steps of:

receiving, at the PSTN, an inbound call for a mobile communication unit;

sending an inbound call notification containing, which identifies the mobile communication unit, from the PSTN to a controller of the wireless communication system;

determining, within the controller, the base station with which the mobile communication unit is currently associated;

sending a notification of the inbound call from the controller to the base station with which the mobile communication unit is associated;

reserving, at the base station, a communication channel between the base station and the PSTN over which the inbound call is to be routed;

notifying the controller, by way of a message from the base station, as to the communication channel reserved;

notifying the PSTN, by way of a message from the controller, as to the communication channel reserved; and routing the inbound call from the PSTN to the base station over the communication channel reserved.

\* \* \* \* \*

UNITED STATES PATENT AND TRADEMARK OFFICE
CERTIFICATE OF CORRECTION

PATENT NO. : 5,509,053
DATED : Apr. 16, 1996
INVENTOR(S) : Gowda et al.

It is certified that error appears in the above-indentified patent and that said Letters Patent is hereby corrected as shown below:

On the title page, item
    [75] Inventors: reads "Nu S. Woon"
    should be -- Ng S. Woon --.

Column 8, Line 10 reads "Of"
    should be -- of --.

Signed and Sealed this

Twenty-third Day of July, 1996

*Attest:*

BRUCE LEHMAN

*Attesting Officer*     *Commissioner of Patents and Trademarks*